United States Patent [19]
Martin et al.

[11] Patent Number: 4,659,136
[45] Date of Patent: Apr. 21, 1987

[54] COLLAPSIBLE ENCLOSURE APPARATUS

[76] Inventors: John W. Martin; Judith T. Martin, both of 3133 Bolgos Cir., Ann Arbor, Mich. 48105

[21] Appl. No.: 862,327

[22] Filed: May 12, 1986

Related U.S. Application Data

[63] Continuation of Ser. No. 599,995, Apr. 13, 1984, abandoned.

[51] Int. Cl.$^4$ ............................................. B60P 7/02
[52] U.S. Cl. ...................................... 296/100; 296/56; 296/57 R; 296/165; 296/26; 105/377; 410/129; 49/163; 49/505
[58] Field of Search ............... 296/26, 27, 10, 37.6, 296/100, 76, 56, 57 R, 165; 105/377; 104/280, 157, 146; 49/61-63, 65, 67, 163, 169, 170, 463, 465, 505; 410/129, 145-146, 151

[56] References Cited

U.S. PATENT DOCUMENTS

| | | | |
|---|---|---|---|
| 1,583,443 | 5/1926 | Casey | 49/163 |
| 1,712,363 | 5/1929 | Sparshatt | 296/100 |
| 2,074,358 | 3/1937 | Bixel et al. | 296/100 |
| 2,550,856 | 5/1951 | Ouellet et al. | 49/465 |
| 2,853,340 | 9/1958 | Hershberger | 296/100 |
| 3,165,352 | 1/1965 | Hallock et al. | 296/100 |
| 3,165,762 | 1/1965 | Hage | 114/361 |
| 3,342,523 | 9/1967 | Lutgen | 296/100 |
| 3,390,641 | 7/1968 | Jacoby | 104/280 |
| 3,612,601 | 10/1971 | Himka et al. | 296/57 R |
| 3,688,787 | 9/1972 | Feather | 296/100 |
| 3,836,769 | 9/1974 | Wilson | 296/10 |
| 3,861,081 | 1/1975 | Maskell | 49/463 |
| 3,910,629 | 10/1975 | Woodard | 296/101 |
| 4,068,886 | 1/1978 | Gostomski | 296/100 |
| 4,198,785 | 4/1980 | Marulic et al. | 49/304 |
| 4,199,188 | 4/1980 | Albrecht et al. | 296/100 |
| 4,252,363 | 2/1981 | Rodrigue | 296/100 |
| 4,397,497 | 8/1983 | Alonzo, Jr. et al. | 296/100 |
| 4,449,876 | 5/1984 | Gaglanton | 410/151 |
| 4,507,033 | 3/1985 | Boyd | 296/37.6 |

OTHER PUBLICATIONS

"Retractable Pickup Cover", p. 36, RVN, Aug. 1983.
"Telescopic Top", p. 115, Popular Science, Mar. 1984.
"Convertable Cap", Peel Enterprises, Grand Haven, Mich. (approx. Spring 1983).
"Now You See It . . . Now You Don't—Convert-A-Cap", Sales Engineering Enterprises, date unknown.
"TRAXystems . . . A New System of Modular Truck Bed Accessories", TRAXystems, Westminster, Calif.—date unknown.
"We're Tops in Payback", Bestop, Boulder, Colo.—date unknown.

Primary Examiner—Robert B. Reeves
Assistant Examiner—Dennis H. Pedder
Attorney, Agent, or Firm—Harness, Dickey & Pierce

[57] ABSTRACT

An improved apparatus for covering at least a part of the open bed of a land or marine vehicle or the like includes an enclosure structure telescopically collapsible and extendable with an access opening and door assembly rearward longitudinally movable portion thereof. An improved end gate assembly is selectively positionable and releasably securable at a number of continuously variable longitudinal locations on the open bed, corresponding with the movable rearward section of the enclosure. The apparatus also includes an improved track assembly for the telescopically collapsible and extendable enclosure sections, with apparatus for substantially preventing or minimizing the accumulation of corrosion, water or other foreign materials that would hinder the smooth and free operation of the enclosure structure.

22 Claims, 20 Drawing Figures

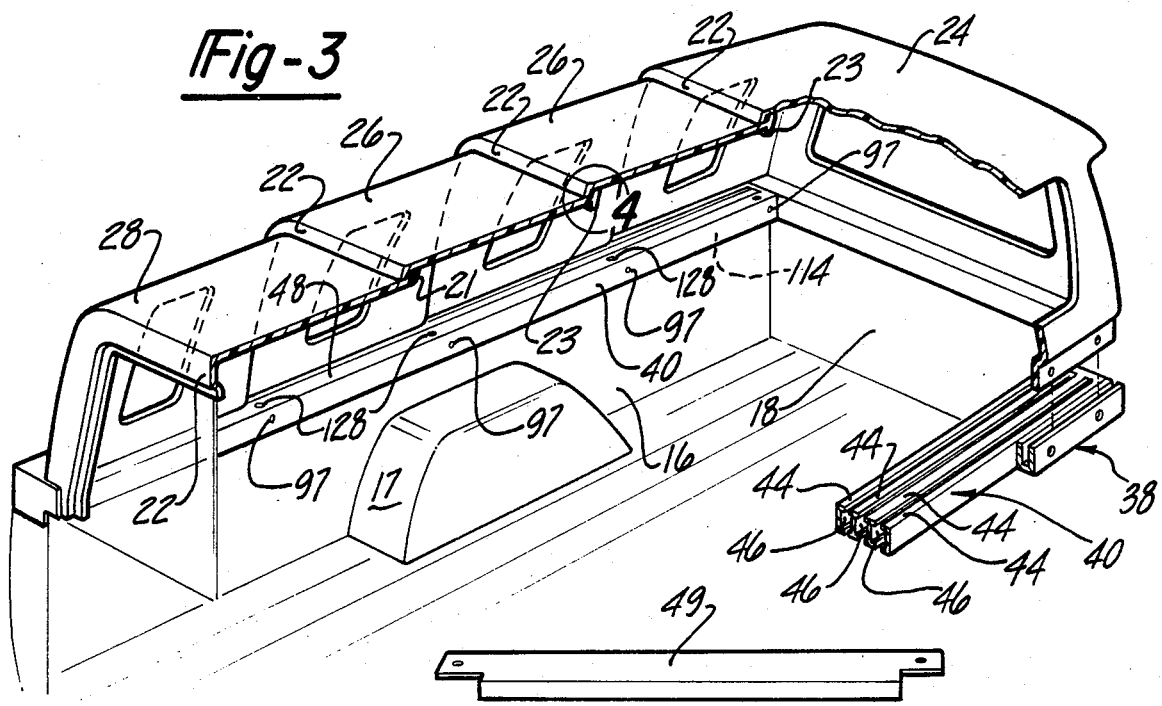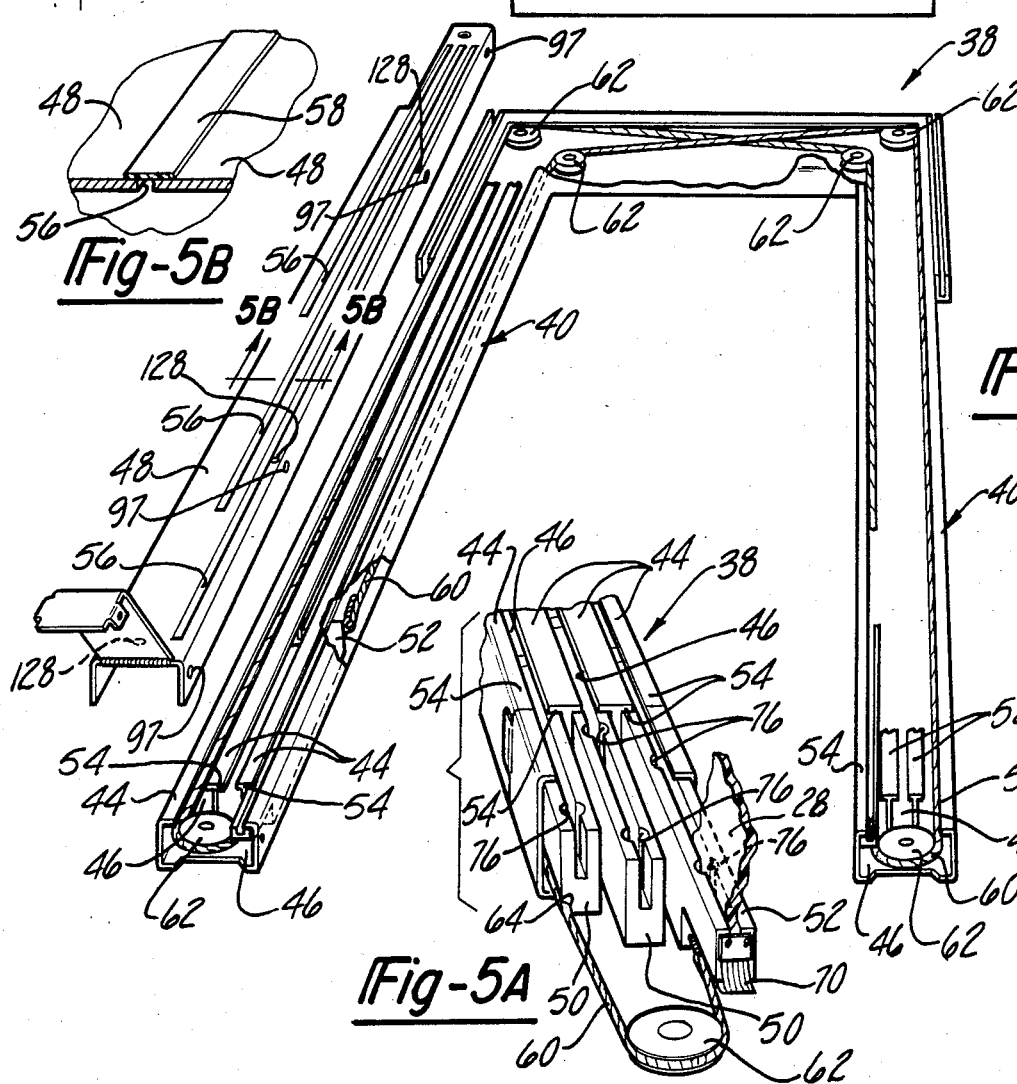

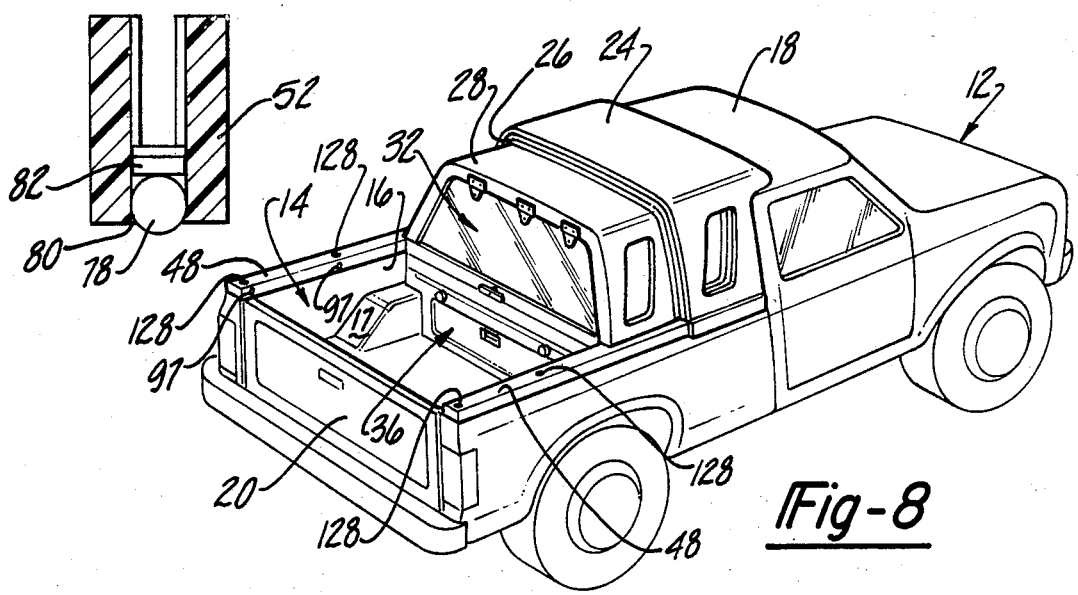
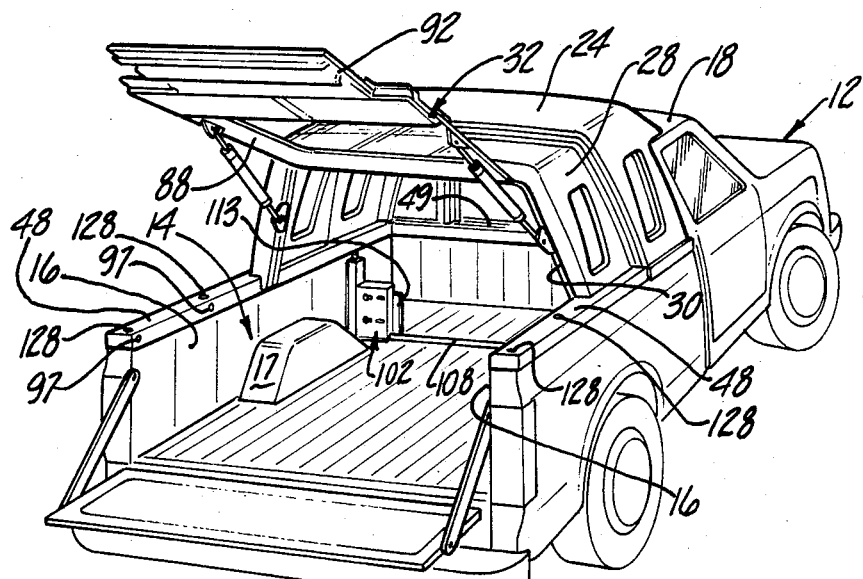
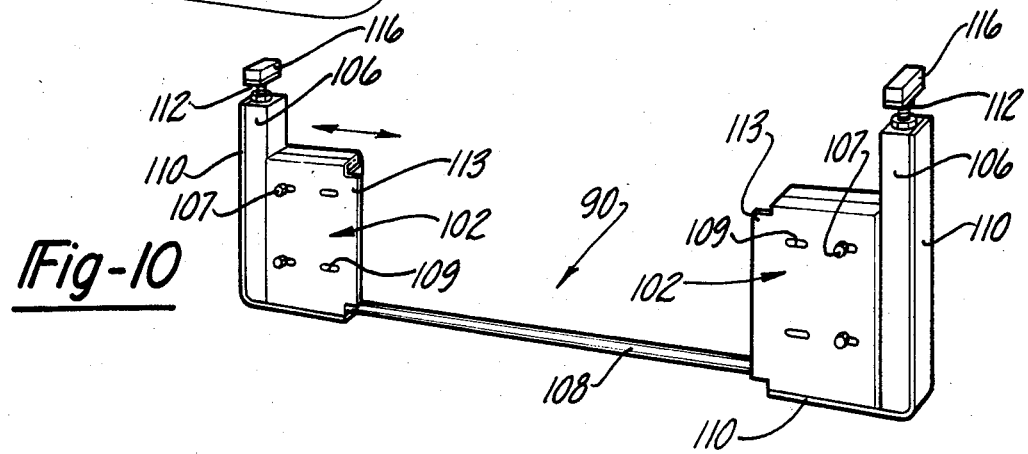

COLLAPSIBLE ENCLOSURE APPARATUS

This is a continuation of U.S. patent application Ser. No. 599,995, filed Apr. 13, 1984, abandoned.

BACKGROUND AND SUMMARY OF THE INVENTION

The invention relates generally to an enclosure apparatus for covering at least a part of an open bed or bed-like portion of a truck, trailer, boat, or other vehicle or the like. More particularly, the invention relates to improvements in enclosures of the telescopically collapsible and extendable type, wherein one or more enclosure sections are slidable movable along a track-like device on the vehicle.

A wide variety of fixed and retractable enclosures for open portions of vehicles and the like having previously been provided and are known in the art. Such enclosures include accordian-type soft-sided foldable covers or enclosures that are made of canvas or other heavy fabrics and have a number of movable and relatively rigid skeletal frame members, as well as hard-top enclosures having a number of rigid, generally bow-shaped enclosure sections telescopically movable relative to one another. Still other known retractable and extendable enclosures have included various combinations of hard-top and soft-top elements.

The above-described prior enclosure devices have, however, proved to be tedious, cumbersome and inconvenient to install, remove and use, as well as severely limiting the utility and cargo-carrying capabilities of the vehicle on which the enclosure device is installed. Other disadvantages of the prior enclosures include leaky joints between connecting components, the lack of a relatively secure and lockable storage area, and the inability or inconvenience of transporting cargo while the enclosure is in any of its partially or wholly collapsed or extended configurations. Furthermore, such prior enclosures have presented other problems such as jamming or binding of movable enclosure sections as a result of the build-up of corrosion, water or other foreign materials in their track-like devices such that smooth operation of the enclosure is hindered. The need has therefore arisen for a retractable, self-storing enclosure apparatus that allows for quick and convenient conversion between a covered bed and open bed configuration, while still maintaining its durability, rigidity, security, weather resistance and ease of operation, without unduly minimizing the utility of the vehicle upon which it is installed. It is thus one of the objects of the present invention to provide such an enclosure apparatus that offers a greater degree of flexibility in its cargo-carrying capabilities and that can be used to transport cargo in any of its collapsed or extended configurations.

In accordance with a preferred embodiment of the present invention, an improved apparatus for covering at least part of an open bed of a vehicle or the like includes an enclosure structure telescopically collapsible and extendable on the vehicle and having a rearward portion longitudinally movable relative to the open bed as the enclosure structure is collapsed or extended. The rearward portion, which includes an access opening therein, is selectively positionable and releasably securable at a number of longitudinal locations on the vehicle's open bed. A preferred gate apparatus is also removably positionable at any of the longitudinal locations on the open bed independently of the position of the rearward portion of the enclosure structure. A preferred door assembly includes a door member that is pivotally and removably connected to the rearward portion of the enclosure structure and is pivotally movable between an open door position and a closed door position at which the door substantially covers and closes the access opening. The door assembly also includes a door latching mechanism for selectively and releasably securing the door to the gate apparatus when the movable rearward enclosure portion and gate apparatus are positioned at substantially the same longitudinal location on the open bed of the vehicle and the door is pivoted to its closed door position.

The gate apparatus preferably includes a gate frame assembly that is selectively and releasably securable to the vehicle at any of a number of the above-mentioned longitudinal locations on the open bed, as well as a gate member that is pivotally and removably connectable to the gate frame assembly. The door and gate members can be independently pivotally connected to the rearward portion of the enclosure structure and the gate frame assembly, respectively, or the gate member may be optionally removed from the gate frame assembly and removably secured to the door assembly for pivotal motion therewith. Preferably, the enclosure includes storage means such that both the door member and the gate member may be selectively removed and stored within the enclosure structure independently of the respective rearward portion and gate frame assembly.

A preferred track assembly is provided for longitudinally and slidably supporting one or more telescopically arranged, movable sections of the enclosure structure. The track assembly, upon which the movable enclosure sections are slidably disposed, includes slider members upon which the movable enclosure sections are slidably supported, and means for impeding the entry and accumulation of water or other foreign materials into elongated slots in which the slider members are slidably disposed. The slider members also preferably included a protruding cleaning member for slidably scraping or wiping the interiors of their corresponding elongated slots as the sliders are longitudinally moved therein, thereby reducing the accummulation of corrosion, water or other foreign materials that would hinder the smooth and free operation of the collapsible and extendable enclosure structure.

Additional advantages and features, as well as additional embodiments and variations, of the present invention will become apparent from the subsequent description and the appended claims taken in conjunction with the accompanying drawings.

BRIEF DESCRIPTION OF THE DRAWINGS

FIG. 3 is a partially cut-away, and partially phantom, perspective view of the open bed portion of the vehicle of FIG. 1, illustrating some of the details of the enclosure apparatus, as well as the track mechanism upon which the movable enclosure sections are slidably mounted.

FIG. 5 is a partially exploded perspective view of the track mechanism for the enclosure apparatus of FIG. 1.

FIG. 5A is a detail perspective view of the left-hand side of the track mechanism of FIG. 5, as viewed in FIG. 4, along with its associated slider members.

FIG. 5B is a cross-sectional view, taken generally along line 5B—5B of FIG. 5.

FIG. 7 is a cross-sectional view taken along line 7—7 of FIG. 6.

FIG. 8 is a perspective view of the vehicle and enclosure apparatus of FIG. 1, showing the enclosure apparatus partially extended to an intermediate longitudinal location on the open bed of the vehicle.

FIG. 9 is a view somewhat similar to FIGS. 8, but illustrating the door member and gate member of the enclosure apparatus connected to one another and pivoted to an open position.

FIG. 10 is a perspective view of the gate frame assembly of a preferred gate assembly for the enclosure apparatus of FIGS. 1 through 9.

FIG. 17 is an overall perspective view illustrating the principles of the present invention as applied in a collapsible and extendable enclosure for a trailer or the like.

DETAILED DESCRIPTION OF THE PREFERRED EMBODIMENTS

Figure 1:
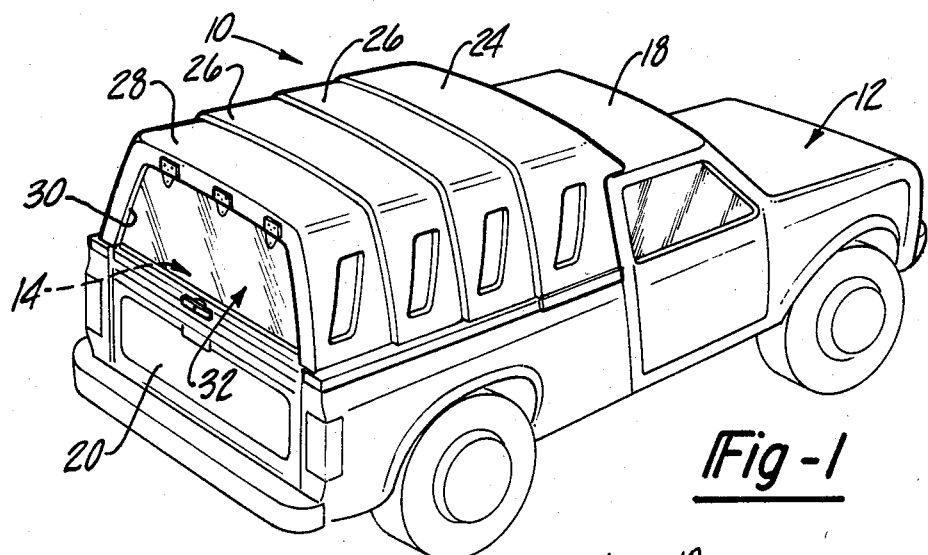
FIG. 1 is a perspective view of an exemplary vehicle having an enclosure apparatus on its open bed according to the present invention, with the enclosure apparatus shown in a fully-extended position.

FIGS. 1 through 18 of the drawings depict merely exemplary embodiments of the present invention for purposes of illustration only. One skilled in the art will readily recognize from the following discussion that the principles of the present invention are equally applicable to enclosures for vehicles other than the exemplary pick-up truck, trailer, and marine vehicles shown in the drawings, as well as to suitable non-vehicular applications.

Figure 2:
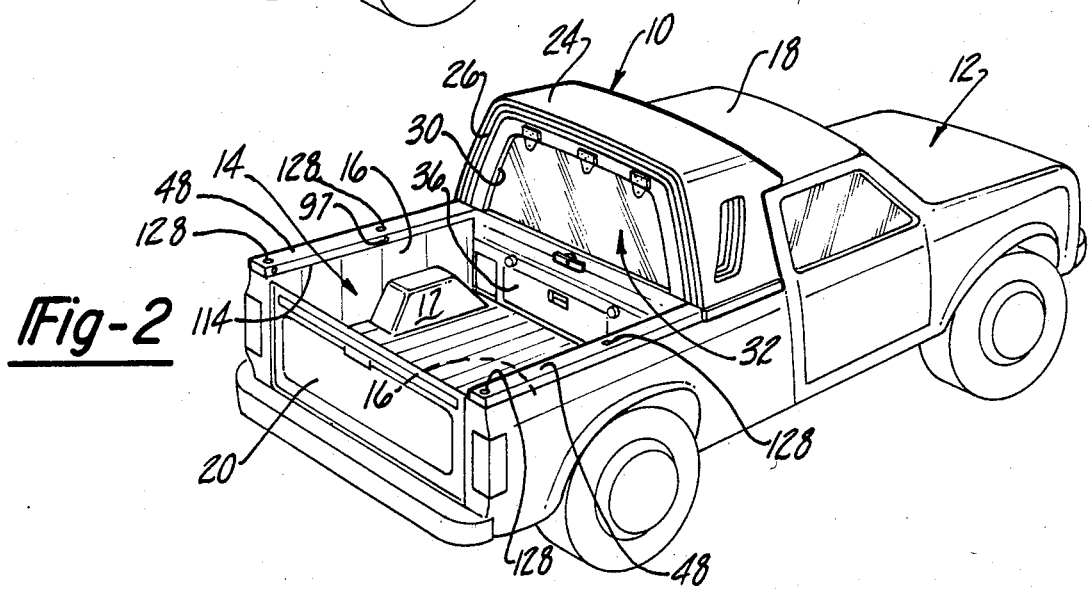
FIG. 2 is a perspective view of the vehicle and enclosure apparatus of FIG. 1, but with the enclosure apparatus shown in a retracted position.

Referring initially to FIGS. 1 and 2, an exemplary preferred enclosure apparatus 10 according to the present invention is shown installed on a pick-up truck vehicle 12. The enclosure apparatus 10 is adapted for enclosing or covering at least a part of an open bed 14, which is defined by a pair of laterally-spaced side walls 16 and by a longitudinally spaced cab 18 and tailgate 20. The enclosure apparatus 10 includes at least one fixed enclosure section 24 and a relatively movable rearward enclosure section 28 at its rearward end, and preferably includes one or more relatively movable intermediate enclosure sections 26. The rearward enclosure section 28 includes an access opening 30 selectively closable by a door assembly 32, which is removably connected to the rearward enclosure section 28.

As shown primarily in FIGS. 1, 2 and 8, the enclosure apparatus 10 is longitudinally collapsible and extendable between the fully extended position illustrated in FIG. 1 and the fully collapsed position illustrated in FIG. 2, and may also be longitudinally collapsed or extended into one or more intermediate positions, as shown in FIG. 8. The rearward end enclosure section 28 is thus selectively positionable at any of a number of longitudinal locations on the open bed 14 of the vehicle 12. As will be described more fully below, a gate assembly 36 is also selectively but independently positionable at any of the above-mentioned longitudinal locations in the open bed 14, and is adapted to cooperate with the door assembly 32 such that a substantially secure and protected space is provided at any of the fully-extended, fully-collapsed, or intermediate positions of the enclosure apparatus 10. As perhaps best seen in FIGS. 1, 2, and 8 through 14, the gate assembly 36 is positionable and removably securable to the open bed 14 at a number of continuously variable longitudinal locations between the forward and rearward ends of the open bed 14, at which longitudinal locations the rearward enclosure section 28 can be removably secured to the gate assembly 36, as is shown in FIG. 2 and explained in more detail below in connection with FIGS. 8 through 14.

Figure 4:
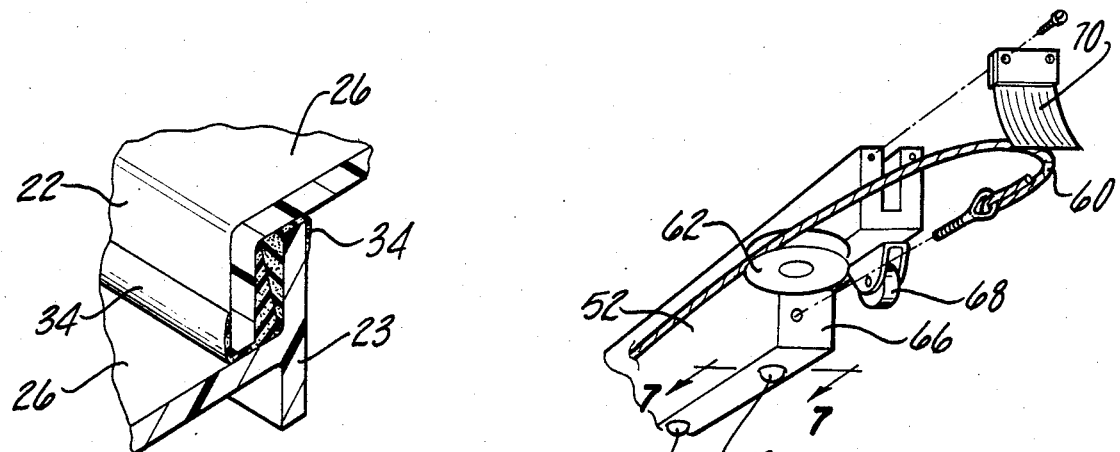
FIG. 4 is an enlarged cross-sectional view of the circled portion of FIG. 3.

As is shown in FIGS. 3 and 4, each of the enclosure sections 24, 26 and 28, includes a downwardly-depending flange portion 22. The rearward section 28 also includes an upwardly-protruding flange portion 21, while the intermediate sections 26 include generally T-shaped flanges 23, at the opposite longitudinal ends from the downward flanges 22. The flanges 21, 22 and 23 abuttingly cooperate so as to collapse and extend the various enclosure sections 26 and 28 merely by longitudinally moving the rearward section 28, as well as limiting their longitudinal movement between preselected longitudinal limits. The flanges 21 and 22 preferably extend continuously along the end portions of their respective enclosure sections, and also preferably include sealing members 34 thereon, as shown in FIG. 4. The flanges 23 can be discrete segments located at various positions, such as at the corners and at laterally medial positions, along the end portions of their respective enclosure sections, and also include the sealing members 34 thereon. Alternatively, the flanges 23 can be continuous along their respective enclosures. The sealing members on each enclosure section are adapted to slidingly and sealingly engage both the outer surfaces and the sealing members of the respective adjacent enclosure sections, thereby substantially minimizing the infiltration of air, water, dust or other foreign materials through the joints between adjacent enclosure sections.

As shown in FIGS. 3 through 7, the movable enclosure sections 26 and 28 are longitudinally and slidably movable along a track assembly 38, which includes a pair of rail assemblies 40 extending longitudinally along the side wall 16 of the open bed 14 and secured thereto.

Each of the rail assemblies 40 includes a number of laterally-spaced, longitudinally-extending rail members 44, with each laterally adjacent pair of the rail members 44 defining an elongated slot 46 therebetween. Generally, the elongated slots 46 are of different predetermined longitudinal lengths having their respective ends at predetermined positions in order to limit the amount of slidable movement of the respective movable sections 26.

In the preferred embodiments, the intermediate slider members 50 and the rearward slider members 52 are each slidably received in their respective elongated slots 46 on each lateral side of the open bed 14 and are free to longitudinally and slidably move therein. One of the slider members 50 is connected to each lateral side of each of the intermediate enclosure sections 26, and similarly one of the rearward slider members 52 is connected to each lateral side of the rearward enclosure section 28, with the lateral side portions of the respective enclosure sections extending upwardly through the elongated slots 46. The slider members 50 and 52 are retained within the elongated slots 46 by flange portions 54, which are fixed to the rail members 44 and extend laterally in a partially overlapping relationship with the upper periphery of the elongated slots 46.

Each of the rearward slider members 52, which slidably carry the rearward enclosure section 28, is connected at both its rearward and forward ends to a cable 60 that extends throughout the rail assemblies 40 and the forward portion 42 and is movably carried by a number of sheaves 62. As can be readily seen in FIG. 5, the cable 60 and the sheaves 62 are configured such that when either a rearward directed or a forward directed force is exerted on a lateral side of the rearward enclosure section 28, an equal and similarly directed force is transmitted through the cable 60 and is exerted on the opposite lateral side of the rearward enclosure section 28. This force equalization feature contributes significantly to the ease of operation of the longitudinally collapsing or extending enclosure apparatus 10, as well as substantially reducing the possibility of the rearward enclosure section 28 jamming or being subjected to unacceptable drag resulting from substantially unbalanced forces being applied to its opposite lateral sides.

As can be readily seen from FIG. 5A, which corresponds to the left-hand rail assembly 40 as viewed in FIG. 5, the laterally outermost slider member 50 preferably includes a recessed portion 64 on its laterally outer side that provides clearance for the free and smooth relative movement between this slider member 50 and the cable 60. It should be noted, in this regard, that the detail view shown in FIG. 5A for the left-hand rail assembly 40 is typical for the right-hand rail assembly 40, but is opposite-handed with respect thereto.

Figure 6:
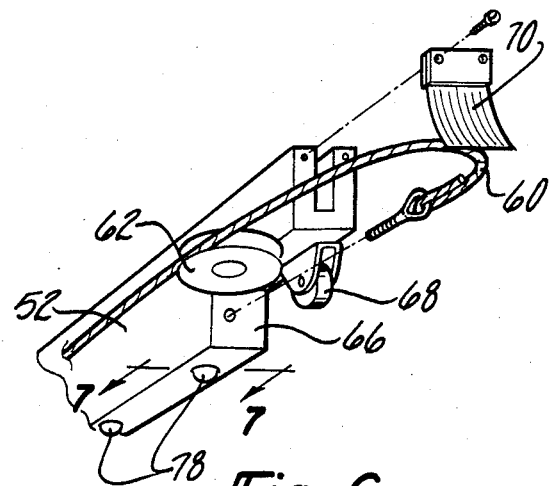
FIG. 6 is a partial bottom perspective view of one of the slider members along with associated components of the track assembly of FIG. 5.
Figure 11:
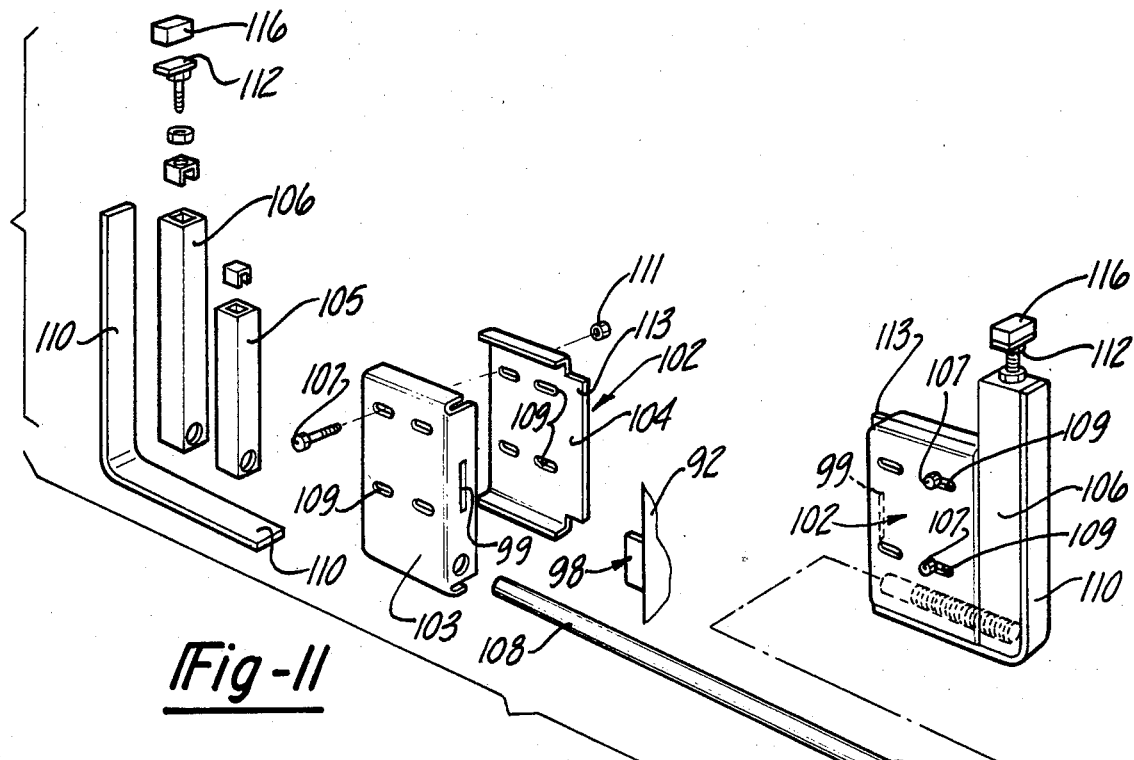
FIG. 11 is a partially exploded view of the gate frame assembly of FIG. 10.
Figure 12:
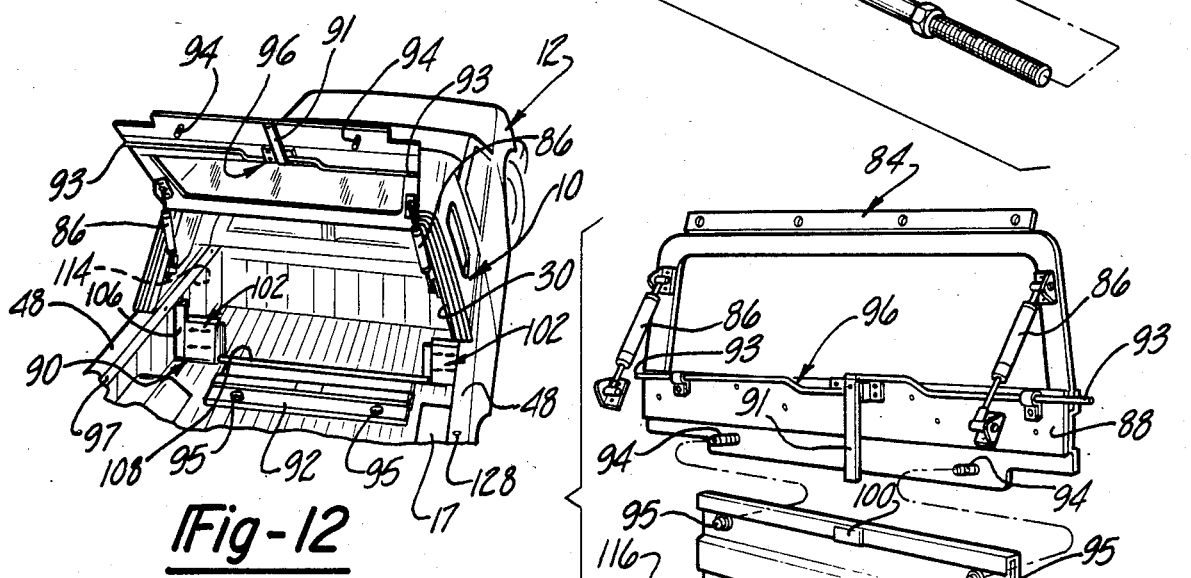
FIG. 12 is a rear perspective view of the vehicle and enclosure apparatus of FIG. 1, illustrating the door member in an open door position and the gate member independently pivoted to an open gate position on the gate frame assembly.
Figure 13:
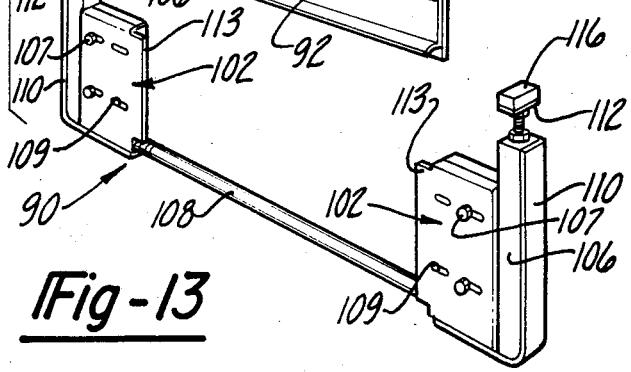
FIG. 13 is an exploded perspective view of the door member, gate member and gate frame assembly of FIG. 8 through 12, illustrating the cooperating interrelationship thereof.
Figure 14:
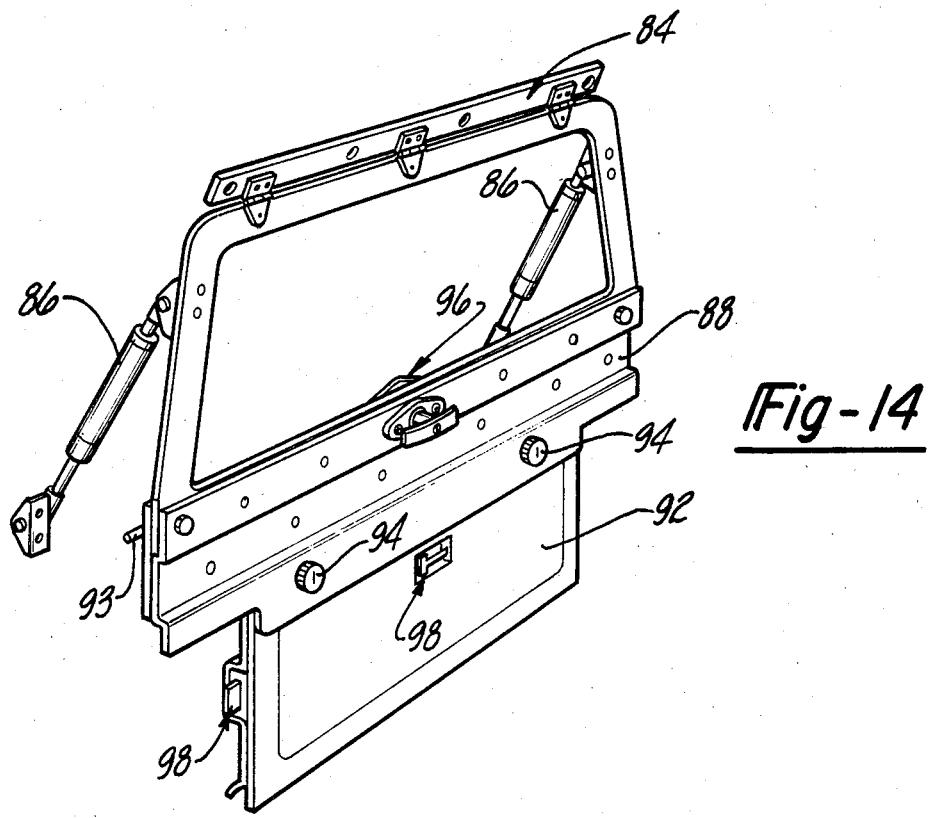
FIG. 14 is a rear perspective view of the door member with the gate member removably secured thereto.

As shown in FIG. 6, the rearward slider members 52 include a stepped or cut-away portion 66 on their rearward ends. Such stepped portions 66 provide clearance for the provision of a load-bearing wheel or caster 68, which also significantly contributes to the smooth operation of the enclosure apparatus 10. When a rearwardly-directed force is exerted on the rearward enclosure section 28 in order to extend the enclosure apparatus 10, a moment or force couple is created and results in an undesirable downwardly-directed force on the rearward end of the sliders 52. The effects of such undesirable force are counteracted and largely diminished by the load-bearing capabilities of the casters 68 at the rearward ends of the enclosure sections 28, thereby allowing the rearward enclosure section 28, and the other enclosure sections to be moved freely and smoothly as the enclosure apparatus 10 is longitudinally extended. Also for purposes of assuring smooth operation of the enclosure apparatus 10, the rearward ends of the rearward slider members 52 are provided with a protruding cleaning member 70 for slidably engaging, wiping or scraping the interior of the corresponding elongated slot 46 as the slider member 52 is longitudinally moved within the slot. Such sliding, wiping or scraping engagement of the cleaning member 70 with the interior of the elongated slot 46 serves to clean and remove corrosion, water, or other foreign material from the interior of the slot, thereby keeping the slot clear for free sliding movement of the slider members.

As shown in FIG. 7, which is a cross-sectional view taken through one of the slider members 52 but is a typical cross-section for any of the slider members 50 or 52, a series of longitudinally-spaced bores 76 are provided in each of the slider members 50 and 52. A ball or roller bearing member 78 is rotatably disposed within each of the bores 76 and is restrained for rotation between a reduced-diameter portion 80 of the bore 76 and a retainer member 82, which is force-fitted or otherwise tightly secured within the bore 76. The reduced-diameter portion 80 of the bore 76 is sized and configured such that the ball bearing 78 protrudes outwardly from the lower edge of the slider member 50 or 52 and is backed-up by the retainer member 82, thereby providing a low-friction, ball bearing support for the slider members 50 and 52 as they are moved longitudinally within their respective elongated slots 46. Preferably, the ball bearing 78, the slider members 50 and 52, and the retainer member 82 are composed of suitable anti-friction materials in order to minimize the friction and drag on the slider member 50 and 52 and thus on their respective movable enclosure sections.

As is perhaps best seen in FIGS. 5, 5A and 5B, the rail assemblies 40 of the track assembly 38 are covered, enclosed and interconnected by cover members 48 and 49, respectively, such that the elongated slots 46, the slider members 50 and 52, the cable 60, and the sheaves 62 throughout the entire track assembly 38 are substantially protected from exposure to water, dust and other foreign materials that may corrode the components or otherwise impede free and smooth operation of the enclosure apparatus 10. The cover members 48 on each lateral side of the open bed 14 include a number of longitudinally-extending openings 56 therein. Preferably, each of the elongated openings 56 has a resilient flap or sealing member 58 in an overlying relationship therewith (or alternatively, in an underlying relationship therewith). The flap member 58 sealingly engages the surfaces of the cover member 48 generally adjacent the openings 56 in order to substantially impede the entry of water, dust or other foreign materials into the slots. Furthermore, because the flap members are composed of a resilient material such as an elastomer, for example, they are resiliently deflectable as the enclosure sections are slidably and longitudinally moved within the elongated openings 56 and the elongated slots 46. Preferably, the flap members 58 are secured to the cover members 48 on the laterally-outer sides of the respective openings 56, such that when resiliently deflected by the enclosure sections, they will sealingly and slidably engage the lateral portions of the enclosure sections and thereby cause water or other materials to flow or be deflected outwardly away from the enclosure apparatus 10.

Referring primarily to FIGS. 8 through 14, a preferred door member 88 of the door assembly 32 is pivotally and removably connected to the rearward enclosure section 28, generally adjacent the access opening 30, and is therefore longitudinally movable with the enclosure section 28 as the enclosure apparatus 10 is collapsed or extended. Thus, the door member 88 is pivotally movable between an open door position shown in FIGS. 9 and 12, and a closed door position shown in FIGS. 1, 2 and 8, regardless of the longitudinal location of the rearward enclosure section 28. Furthermore, the gate assembly 36 is removably positionable and securable to the vehicle 12 at any of a number of longitudinal locations in the open bed 14, separately and independently of the longitudinal location of the rearward enclosure section 28 and the door assembly 32.

Referring primarily to FIG. 9 through 13, the gate assembly 36 includes a gate frame assembly 90 and a gate member 92. As is discussed in more detail below, the gate member 92 is preferably removably and pivotally attachable to the gate frame assembly 90 so that it can be pivotally moved between an open gate position shown in FIG. 12, and a closed gate position in FIGS. 2, and 8, with such pivotal movement of the gate member 92 being separate and independent of the longitudinal location of the gate frame assembly 90 and the other components of the enclosure apparatus 10. The preferred gate member 92 may also optionally be removed from the gate frame assembly 90 and removably secured to the door member 88, as shown in FIGS. 9 and 12 through 14, such that the gate member is pivotally movable with the door member 88 between the open and closed door positions discussed above. Such optional connectability of the gate member 92 to the door member 88 is preferably provided by means of quick-release, threaded fastener devices 94 and their receptacles 95, or by means of other alternate quick-release attachment devices known to those skilled in the art.

It should be noted that the door member 88 is equipped with a door latching mechanism 96, and that the gate member 92 is equipped with a gate latching mechanism 98 separate and independent of the door latching mechanism 96. Thus, the gate latching mechanism 98 is adapted for selectively and releasably securing the gate member 92 to the gate frame assembly 90 in its closed gate (by being received in the slots 99) position when the gate member 92 is removably attached to the gate frame assembly 90. The gate latching mechanism 98 is also adapted for selectively and releasably securing the gate member 92 to the gate frame assembly 90 when the gate member 92 is attached to the door member 88 and the door member 88 is moved to its closed door position. Further, the door latching mechanism 96, which includes the latch member 91 shown in FIGS. 12, 13 and 16, can be used for releasably securing or latching the door member 88 to the gate member 92 (by way of the spacer portion 100), as well as to the cover members 48 (by way of pins 93 and apertures 97, as shown in FIGS. 3 and 5 for example), when the door member is pivoted to its closed door position while the gate member 92 is not connected to the door member 88. Such latching interconnection between the gate member 92 and the door member 88 is also provided by the door latching mechanism 96, when the gate member 92 is secured to the door member 88 by way of the fastener devices 94 and their receptacles 95. It should also be noted that the door latching mechanism 96 is selectively operable for releasably locking and securing the door member 88 to the tailgate 20 when the enclosure apparatus 10 is fully extended and the door member 88 is closed.

The door latching mechanism 96 and the gate latching mechanism 98 shown in the drawings are merely examples of such latching mechanisms shown for purposes of illustration. One skilled in the art will readily recognize, however, that any of a number of known and conventional latching mechanisms may be substituted for the door latching mechanism 96 and the gate latching mechanism 98, with appropriate modifications as needed.

As perhaps best shown in FIGS. 9 through 13, one preferred example of the gate frame assembly 90 includes a pair of spaced-apart side assemblies 102, each of which are positionable generally adjacent one of the side walls 16 of the open bed 14 at any of a number of longitudinal locations therein. In the exemplary embodiment shown in the drawings, each of the side assemblies 102 is of a multi-piece construction, including side panels 103 and 104, and side posts 105 and 106. The side panels 103 and 104 are attached to the side posts 105 by means of fasteners 107, elongated openings 109, and nuts 111, and thus can be laterally adjusted for different sizes of gates (or different sizes of components can alternatively be provided). Stop flanges 113 are provided on the side assemblies 102 for engaging the gate member 92 when it is closed. It should be emphasized that the multi-piece construction of the side assemblies is exemplary only, and that various multi-piece parts of the gate frame assembly 90 may alternatively be fabricated as one-piece components.

An elongated rotatable rod member 108 is threaded on at least one end portion thereof, and thus threadably engages at least one of the side assemblies 102 while abuttingly engaging the opposite side assembly 102. By such an arrangement, rotation of the rod member 108 in a first rotary direction pressurably biases and forcibly urges the side assemblies 102 away from one another, and rotation of the rod member 108 in an opposite rotary direction allows the side members to be freely moved toward one another for removal from the open bed. Thus, when the rod member is rotated so as to forcibly urge the side assemblies away from one another, the side assemblies 102 are adjustably and forcibly urged into a frictional and abutting engagement with their associated side walls 16 in order to removably secure the gate frame assembly 90 to the vehicle within the open bed 14. In order to enhance the frictional engagement of the side assemblies 102 with the inside surfaces of the side walls 16, and further to prevent scratching or otherwise damaging the side walls 16, protective molding strips 110 fabricated from an elastomer or other resilient material are provided on the lower and outer edges of the side assemblies 102.

The outer side posts 106 are also preferably equipped with threadably extendable and retractable abutment members 112 that are vertically adjustable and extendable into a frictional abutting engagement with the flange portions 114 typically provided on the upper edges of the side walls 16 of many pick-up trucks. The abutment members may optionally be provided with protective pod members 116 composed of an elastomer or other resilient material and frictionally engaging the lower surfaces of the flange portions 114 without substantially exposing them to scratching or other damage. The interaction of the side assemblies 102 and the abutment members 112, being forcibly urged into a frictional abutting engagement with their respective portions of the side walls 16, results in a secure, but removable and releasable, attachment of the gate frame assembly 90 at any of a number of longitudinal locations within the open bed 14. It should also be noted that the provision of the side assemblies 102 allows the gate member 92 to be of a lesser width, allowing the gate member 92 to be closed even when the rearward enclosure section 28 is positioned such that the gate member 92 is between the wheel wells 17 of the pick-up truck. Thus the side assemblies 102 also fill the lateral space between the side walls 16 and the gate member 92 when the gate frame assembly 90 is positioned at longitudinal locations other than between the wheel wells 17.

Figure 15:
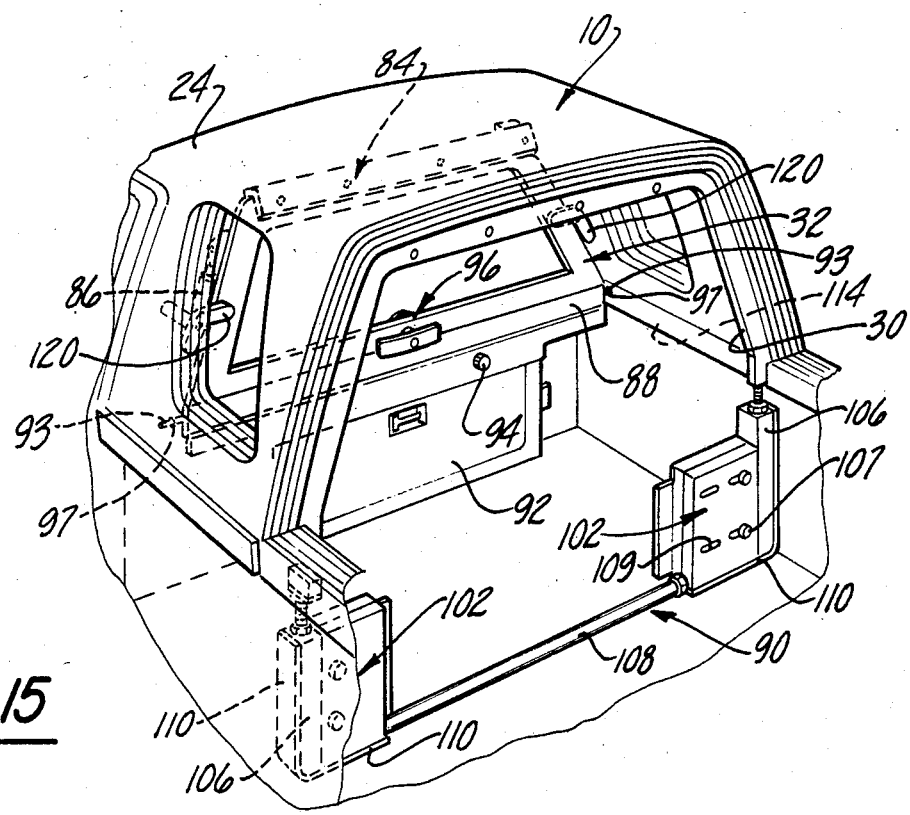
FIG. 15 is a partially perspective, phantom view, illustrating the door member and gate member releasably secured and stored in the interior of the enclosure apparatus.

As shown in FIG. 15, the door assembly 32, which includes a hinge assembly 84 and door operation assist devices 86, in addition to the door member 88, is selectively removable from the rearward end of the rearward enclosure section 28 (by way of the quick-release fasteners 136 shown in FIG. 16) and can be stored within the interior of the enclosure apparatus 10. Such storage of the door assembly 32 can be accomplished either with the gate member 92 secured to the door member 88 by way of the fastener devices 94 and 95, as shown in FIG. 15, or separately without the gate member attached thereto. Preferably, the enclosure apparatus 10 includes latch devices 120, which are selectively operable for receiving and releasably securing the door assembly 32 to a forward interior portion of the enclosure apparatus 10, with or without the gate member 92 being attached to the door member 88.

Figure 16:
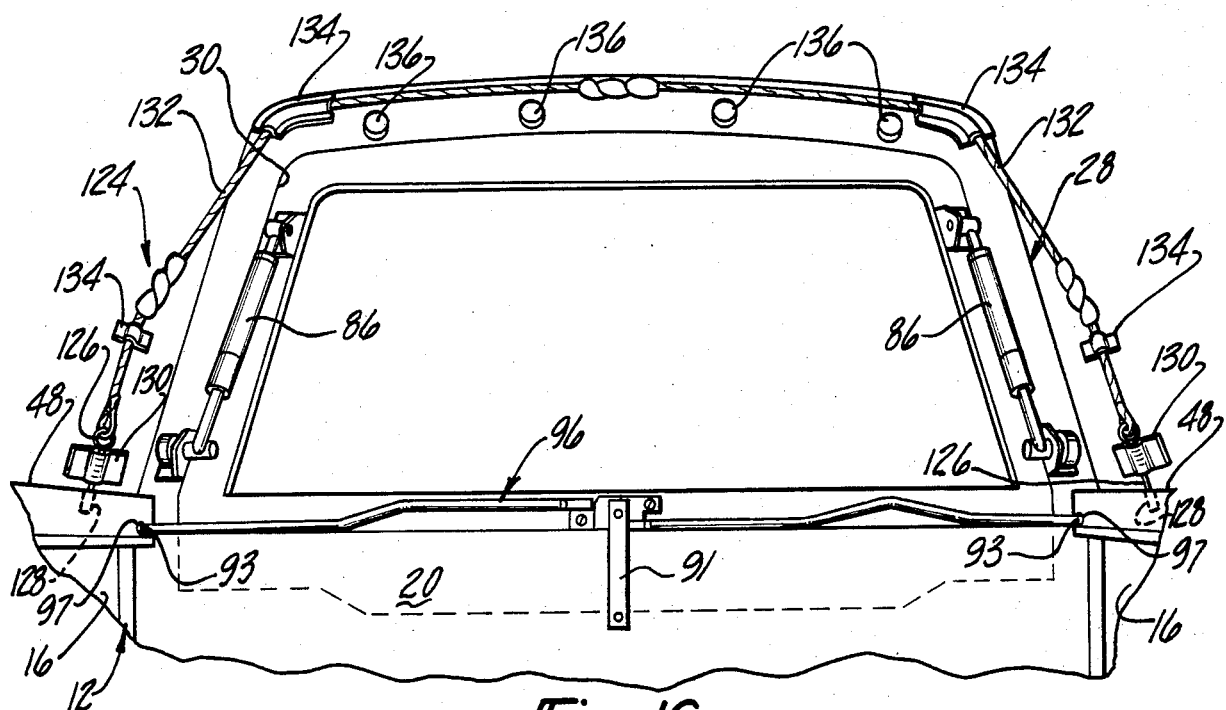
FIG. 16 is a partial elevational view, looking generally rearward from inside the enclosure apparatus, showing the door member and the mechanism for releasably securing the movable enclosure sections at preselected longitudinal locations along the open bed.

FIG. 16 is a view of the rearward interior portion of the rearward enclosure section 28, looking longitudinally outwardly from within the open bed 14. An enclosure position locking apparatus 124 is preferably provided at least on the rearward enclosure section 28 for selectively and releasably securing or fixing the position of the enclosure section 28 relative to the open bed at any of a number of longitudinal locations thereon. The exemplary enclosure position locking apparatus 124 shown in the drawings includes at least one, and preferably two, pin members 126 slidably attached to the enclosure section 28 and adapted for slidable movement generally toward and away from the side walls 16 of the pick-up truck vehicle 12. As shown in FIGS. 3 and 5, for example, pin receiving apertures 128 are provided at preselected longitudinal positions along the cover members 48 (which in turn are fixedly attached to the side walls 16). The apertures 128 are located at positions corresponding to each of the above-discussed preselected longitudinal locations and are adapted for interlockingly receiving and engaging the corresponding pin members 126 when the enclosure section 28 is positioned at any of such longitudinal locations. Pin member mounting means 130 are provided and located on corresponding sides of the enclosure section 28 and include spring members or other resilient biasing means for resiliently biasing the pin members 126 downwardly toward the cover members 48 such that the pin members 126 are biasingly moved into an interlocking engagement with the pin receiving apertures 128 as the enclosure section 28 is moved into any of the preselected longitudinal locations. A cable 132 is slidably attached to the enclosure section 28 by way of a number of guides 134 such that both of the pin members 126 may be forcibly retracted against the force of the resilient biasing means and out of interlocking engagement with the pin-receiving apertures 128 by applying a pulling force at a single location along the cable 132.

It should also be noted that the abutment flanges 21, 22 and 23, discussed above, are preferably used in cooperation with the above-described enclosure position locking apparatus 124, as well as the preselected lengths of the elongated openings 56 in the cover members 48 shown in FIG. 5, in order to prevent undesirable longitudinal shifting or movement of the movable intermediate enclosure sections 26 of the enclosure apparatus 10. Horizontal pin means should be provided to restrain the intermediate sections 26 at partially collapsed or extended enclosure configurations. However, a similar position locking apparatus may also be required on the intermediate enclosure sections 26 if other intermediate preselected longitudinal positions of the enclosure apparatus are desired.

Figure 17:
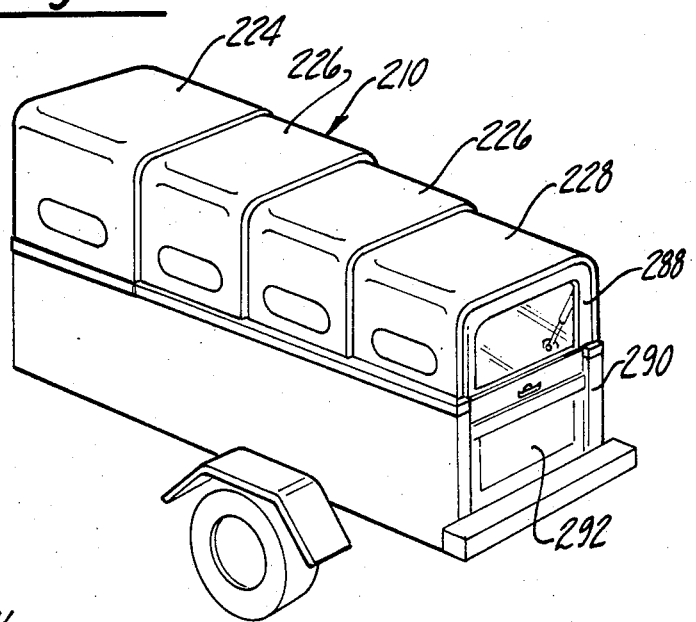
Figure 18:
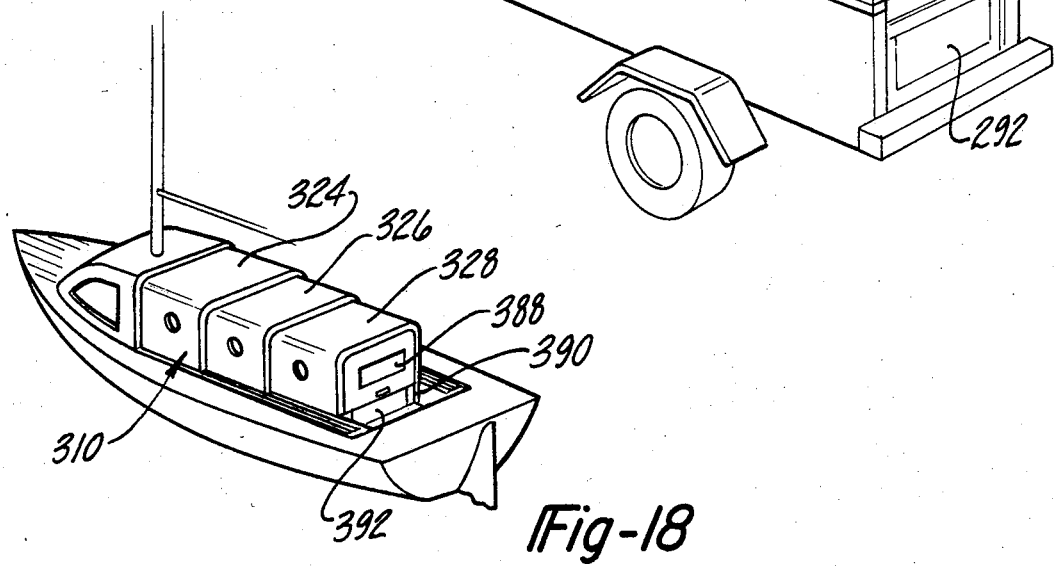
FIG. 18 is an overall perspective view illustrating the principles of the present invention applied to a collapsible and extendable enclosure for a marine vessel.

FIGS. 17 and 18 illustrate only two exemplary alternate applications of the principles of the present invnetion, and many other alternate applications will undoubtedly occur to one skilled in the art as a result of the teachings of the foregoing discussion and the accompanying drawings. In FIG. 17, an alternate enclosure apparatus 210 is illustrated on a trailer (having side walls) for carrying a horse or other animal, with the corresponding elements of the enclosure apparatus 210 bearing element numerals corresponding to those of the enclosure apparatus 10 described above, but having the numeral "2" as a prefix. It should be noted, however, that if the enclosure apparatus 210 is installed on a flatbed-type trailer or other vehicle having no side walls, the gate frame assembly 290 would not be able to frictionally and abuttingly engage any side walls. In such a case, the gate frame assembly could be removably fastenable and positionable at various longitudinal locations on the trailer by means of quick-release fastener devices. The enclosure apparatus 210 is particularly advantageous in the application shown in FIG. 17 since the horse or other animal may be conveniently and easily led onto the trailer while the enclosure apparatus 210 is fully collapsed. The enclosure apparatus 210 may then easily and conveniently be extended around the animal, thereby allowing the entire loading or unloading operation to be performed by the user without having to enter the trailer himself or herself.

FIG. 18 illustrates an alternate enclosure apparatus 310 for a marine vehicle, wherein the corresponding elements have element numerals corresponding to those of the enclosure apparatus 10 discussed above, but having the numeral "3" as a prefix. One skilled in the art will readily recognize that minor modifications to the various elements of the exemplary enclosure apparatus 10 described above may be required in order to adapt such elements to the applications shown for purposes of illustration in FIGS. 17 and 18.

The foregoing discussion discloses and described exemplary embodiments of the present invention. One skilled in the art will readily recognize from such discussion that various changes, modifications and variations may be made therein without departing from the spirit and scope of the invention as defined in the following claims.

We claim:
1. An apparatus for covering at least part of an open bed of a vehicle, the open bed having longitudinally spaced apart forward and rearward ends, said apparatus comprising:

enclosure means collapsibly and extendibly attachable to the vehicle for substantially enclosing at least part of the open bed, said enclosure means including a rearward enclosure portion thereon, said rearward enclosure portion being longitudinally movable relative to the open bed as said enclosure means is collapsed and extended, said rearward enclosure portion further being selectively and continuously positionable at a number of continuously variable longitudinal locations between the forward and rearward ends of the open bed, said rearward enclosure portion further including an access opening therein for providing access to the interior of said enclosure means at any of said continuously variable longitudinal locations;

track means securable to said vehicle, a number of slider members slidably engageable with said track means for longitudinal movement relative thereto, said rearward enclosure portion being interconnected with at least one of said slide members to that said rearward enclosure portion is slidably and telescopically movable generally along said track means;

enclosure locking means for selectively and releasably securing said movable rearward enclosure portion of said enclosure means to the vehicle at any of said continuously variable longitudinal locations on the open bed;

removable gates means for closing off said enclosure means at any of said continuously variable longitudinal locations when said rearward enclosure portion of said enclosure means and said gate means are at the same longitudinal location, said gate means being positionable on the open bed independently of said enclosure means; and door means pivotally connected to said rearward enclosure portion of said enclosure means generally adjacent said access opening thereon and being longitudinally movable therewith, said door means being pivotally movable relative to said rearward enclosure portion at any of said continuously variable longitudinal locations between an open door position generally away from said access opening and a closed door position wherein said door means substantially covers said access opening, said door means further including door latching means for selectively and releasably securing said door means to said gate means when said door means and said gate means are positioned at substantially the same longitudinal location on the open bed of the vehicle.

2. An apparatus according to claim 1, wherein the open bed of the vehicle includes a vehicle gate assembly generally at the rearward end thereof, said enclosure means further being selectively extendible such that said rearward enclosure portion thereof is located at a longitudinal position substantially adjacent the vehicle gate assembly, and said door latching means including means for selectively and releasably securing said door means to the vehicle gate assembly when said rearward enclosure portion is positioned substantially adjacent the vehicle gate assembly and said door means is pivoted to said closed door position.

3. An apparatus according to claim 1, wherein said gate means includes a gate frame assembly removably positionable and securable to the vehicle generally at a number of said continuously variable longitudinal locations on the open bed, a gate member removably and pivotally attachable to said gate frame assembly, said gate member being pivotally movable relative to said gate frame assembly between open and closed gate positions when said gate member is attached to said gate frame assembly, and attachment means for removably and selectively attaching said gate member to said door means independently of said gate frame assembly for pivotal movement with said door means relative to said rearward enclosure portion at any of said longitudinal locations on the open bed.

4. An apparatus according to claim 3, wherein said gate means includes gate latching means for selectively and releasably securing said gate member in said closed gate position when said gate member is attached to said gate frame assembly and for selectively and releasably securing said gate member to said gate frame assembly when said gate member is attached to said door means and said door means is moved to said closed door position.

5. An apparatus according to claim 3, wherein said door means is removably and pivotally connectable to said rearward enclosure portion of said enclosure means, said enclosure means further including storage means therein for receiving and releasably securing and storing said door means within an interior portion of said enclosure means when said door means is removed from said rearward enclosure portion of said enclosure means.

6. An apparatus according to claim 5, wherein said storage means further includes means for receiving and releasably securing and storing said gate means within said interior portion of said enclosure means.

7. An apparatus according to claim 3, wherein said gate frame assembly includes pressure biasing means for forcibly and abuttingly engaging the vehicle in order to removably secure said gate frame assembly to the vehicle at any of said longitudinal locations on the open bed.

8. An apparatus according to claim 1, wherein said enclosure locking means includes pin means slidably attached to said enclosure means for slidable movement generally toward and away from said vehicle, and pin receiving means at predetermined longitudinal positions on the vehicle for interlockingly receiving and engaging said pin means when said rearward portion is positioned at any of said predetermined longitudinal locations and said pin means is received by said pin receiving means.

9. An apparatus according to claim 8, wherein said enclosure locking means further includes resilient biasing means for resiliently biasing said pin means generally toward said pin receiving means and into said interlocking engagement with said pin receiving means as said rearward portion is moved into any of said predetermined longitudinal locations.

10. An apparatus according to claim 9, wherein said pin means includes a number of pin members slidably attached to said enclosure means resiliently biased generally toward said pin receiving means, said enclosure locking means further including cable means movably mounted on said enclosure means and connected to each of said pin members for slidably retracting said pin members out of interlocking engagement with said pin receiving means.

11. An apparatus according to claim 1, wherein said enclosure means includes a number of enclosure sections telescopically and longitudinally movable relative to one another, each of said enclosure sections being interconnected with at least one of said slider members so that said enclosure sections are slidably and telescopically movable generally along said track means.

12. An apparatus according to claim 11, wherein said track means includes a number of longitudinally-extending elongated slots, each of said elongated slots being adapted to slidably receive one of said slider members therein, each of said slider members including a cleaning member protruding therefrom for slidably engaging the interior of the corresponding elongated slot as said slider member and the corresponding enclosure section are longitudinally moved therealong.

13. An apparatus according to claim 1, wherein said enclosure means includes a number of enclosure sections serially and telescopically arranged for longitudinal telescoping movement relative to one another, abutment means on each of said enclosure sections for abuttingly engaging and longitudinally moving a serially adjacent enclosure section as said enclosure means is longitudinally collapsed and extended, each of said abutment means including sealing means sealingly engageable with the abutment means on a serially adjacent enclosure section as said abutment means are abuttingly engaged with one another.

14. An apparatus according to claim 13, wherein each of said abutment means comprises a flange member protruding transversely from the corresponding enclosure section so that the flange members on serially adjacent enclosure sections interferingly and abuttingly limit said relative telescoping movement as said enclosure means is being collapsed and extended.

15. A door and gate assembly for a longitudinally collapsible and extendible enclosure apparatus for covering at least part of an open bed of a vehicle, the open bed of the vehicle having laterally spaced apart side walls at least partially circumscribing the open bed and at least a pair of wheel wells therein adjacent the opposite side walls, an end portion of the enclosure apparatus having an opening therein and being longitudinally movable relative to the open bed as the apparatus is longitudinally collapsed and extended, the end portion being selectively positionable at various longitudinal locations on the open bed, said door and gate assembly comprising:

a gate frame assembly selectively and removably securable to the vehicle generally at a number of said longitudinal locations other than between the wheel wells in the open bed independently of the position of the end portion of the enclosure apparatus, said gate frame assembly including at least a pair of laterally spaced apart gate frame side members, each of said side members being positionable generally adjacent one of the side walls, and selectively operable adjustment means for forcibly urging said side members away from one another into frictional and abutting engagement with the associated side walls such that said gate frame assembly is thereby removably secured to said vehicle at any of said number of longitudinal positions;

a gate member positionable between the wheel wells and being removably and pivotally attachable to said gate frame assembly between said gate frame side members, said gate member further being pivotally movable relative to said gate frame assembly between open and closed gate positions when said gate member is attached to said gate frame assembly, said gate member being removably and pivotally attachable to said gate frame assembly between said side members for said pivotal relative movement at any of said number of longitudinal locations on the open bed independently of the position of the end portion of the enclosure apparatus;

a door member pivotally connected to said end portion of the enclosure apparatus generally adjacent the opening therein and being longitudinally movable therewith, said door member being pivotally movable relative to the end portion at any of said various longitudinal locations between an open door position generally away from the end portion opening and a closed door position substantially covering at least part of the end portion opening, said door member further including door latching means thereon for selectively and releasably securing said door member to said gate member when said door member is closed and said door and gate members are positioned at substantially the same longitudinal location on the open bed of the vehicle; and attachment means for removably and selectively attaching said gate member to said door member independently of said gate frame assembly for pivotal movement with said door member relative to the end portion of the enclosure apparatus at any of said various longitudinal locations on the open bed.

16. A door and gate assembly according to claim 15, further including gate latching means for selectively and releasably securing said gate member in said closed gate position when said gate member is attached to said gate frame assembly and for selectively and releasably securing said gate member to said gate frame assembly when said gate member is attached to said door member and said door member is moved to said closed door position.

17. A door and gate assembly according to claim 15, wherein said gate frame assembly includes pressure biasing means for forcibly and abuttingly engaging the inside of the side walls of the vehicle in order to removably secure said gate frame assembly to the vehicle at any of said number of longitudinal locations on the open bed.

18. A door and gate assembly according to claim 15, wherein said gate frame assembly includes laterally spaced apart side assemblies, and said adjustment means includes an elongated rotatable rod member, said rod member threadably engaging one of said side assemblies and abuttingly engaging the other of said side assemblies on the opposite side of the open bed such that rotation of said rod member in one direction forcibly urges said side assemblies away from one another and rotation of said rod member in an opposite direction allows said side assemblies to be moved toward one another.

19. A door and gate assembly according to claim 18, wherein the side walls include upper flanged portions thereon, said side assemblies each having an adjustably extendible abutment member thereon, said abutment member being selectively extendible into a forcible engagement with the upper flanged portion of the associated side walls.

20. A door and gate assembly according to claim 15, wherein said gate frame side members each include a panel member, said panel members being positioned to receive said removably and pivotally attached gate member therebetween and having lip portions located thereon in order to be engageable by said gate member when said gate member is pivotally attached to said gate frame assembly and moved to said closed gate position, said lip portions on said panel members also being engageable by said gate member when said gate member is attached to said door member and said door member is pivotally moved to said closed door position in at least some of said longitudinal locations.

21. A door and gate assembly according to claim 15, wherein said door member is removably and pivotally connectable to the end portion of the enclosure apparatus, the enclosure apparatus including storage means therein for receiving and releasably securing and storing said door means on an interior portion of the enclosure apparatus when said door means is removed from the end portion of the enclosure apparatus.

22. A door and gate assembly according to claim 15, wherein the open bed of the vehicle includes a vehicle gate assembly generally at a rearward end thereof, the enclosure apparatus being selectively extendable such that the end portion thereof is longitudinally located substantially adjacent the vehicle gate assembly, said door latching means including means for selectively and releasably securing said door member to said vehicle gate assembly when the end portion is longitudinally located substantially adjacent the vehicle gate assembly and said door member is pivoted to said closed door position.

* * * * *

UNITED STATES PATENT AND TRADEMARK OFFICE
CERTIFICATE OF CORRECTION

PATENT NO. : 4,659,136

DATED : April 21, 1987

INVENTOR(S) : Martin, et al

It is certified that error appears in the above-identified patent and that said Letters Patent is hereby corrected as shown below:

Column 3, line 17, "FIGS." should be —FIG.—.

Column 3, line 32, "FIG." should be —FIGS.—.

Column 6, line 37, "member" should be —members—.

Column 10, lines 21-22, "invnetion" should be —invention—.

Column 10, line 59, "described" should be —describes—.

Column 11, line 22, Claim 1, "slide" should be —slider—.

Signed and Sealed this

Twenty-second Day of September, 1987

Attest:

DONALD J. QUIGG

Attesting Officer     Commissioner of Patents and Trademarks